(12) United States Patent
Jacobsen et al.

(10) Patent No.: US 10,288,457 B2
(45) Date of Patent: *May 14, 2019

(54) SENSOR ASSEMBLY (71) Applicant: Grundfos Holding A/S, Bjerringbro (DK)

(72) Inventors: Kjeld Vinther Jacobsen, Randers NV (DK); John B. Jacobsen, Bjerringbro (DK); Mikkel Haugaard, Hobro (DK)

(73) Assignee: Grundfos Holding A/S, Bjerringbro (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/533,193

(22) PCT Filed: Nov. 24, 2015

(86) PCT No.: PCT/EP2015/077413
§ 371 (c)(1),
(2) Date: Jun. 5, 2017

(87) PCT Pub. No.: WO2016/087256
PCT Pub. Date: Jun. 9, 2016

(65) Prior Publication Data
US 2017/0328747 A1 Nov. 16, 2017

(30) Foreign Application Priority Data

Dec. 3, 2014 (EP) .................................... 14196095

(51) Int. Cl.
*G01L 13/00* (2006.01)
*G01D 11/24* (2006.01)
*G12B 9/04* (2006.01)
*G01L 19/14* (2006.01)
*G01L 13/02* (2006.01)

(52) U.S. Cl.
CPC ............ *G01D 11/245* (2013.01); *G01L 19/14* (2013.01); *G12B 9/04* (2013.01); *G01L 13/025* (2013.01)

(58) Field of Classification Search
CPC ........ G01D 11/245; G01L 13/025; G12B 9/04
USPC ......................................................... 73/855
See application file for complete search history.

(56) References Cited

U.S. PATENT DOCUMENTS

| 5,844,135 | A | * | 12/1998 | Brammer | ................. G01K 1/08 73/202.5 |
| 5,975,842 | A | | 11/1999 | Jensen et al. | |
| 6,251,344 | B1 | | 6/2001 | Goldstein | |
| 9,655,311 | B1 | * | 5/2017 | Bell | ....................... A01G 25/16 |
| 2011/0179889 | A1 | * | 7/2011 | De Volder | ............ B29C 33/126 73/866.5 |

(Continued)

FOREIGN PATENT DOCUMENTS

| DE | 197 00 965 C1 | 6/1998 |
| DE | 10 2013 200 775 A1 | 7/2014 |
| DE | 20 2014 103 822 U1 | 10/2014 |

(Continued)

*Primary Examiner* — Max H Noori
(74) *Attorney, Agent, or Firm* — McGlew and Tuttle, P.C.

(57) ABSTRACT

A sensor arrangement includes a sensor which is arranged in a housing constructed of two plastic injection molded parts (2, 3). The electrical leads are sealingly led through the housing (1) and are sealed by way of O-rings which on the one hand bear in a groove of the lead and on the other hand bear in a recess forming the housing feed-through.

23 Claims, 5 Drawing Sheets

(56) References Cited

U.S. PATENT DOCUMENTS

2017/0328746 A1\* 11/2017 Jacobsen .................. G12B 9/04

FOREIGN PATENT DOCUMENTS

| EP | 2 083 250 A1 | 7/2009 |
|---|---|---|
| EP | 2 626 567 A1 | 8/2013 |
| RU | 2076399 C1 | 3/1997 |
| RU | 2292019 C2 | 1/2007 |
| RU | 2296955 C2 | 4/2007 |
| RU | 114374 U1 | 3/2012 |
| RU | 2523767 C2 | 7/2014 |
| WO | 2007/120898 A2 | 10/2007 |

\* cited by examiner

SENSOR ASSEMBLY

CROSS REFERENCE TO RELATED APPLICATIONS

This application is a United States National Phase Application of International Application PCT/EP2015/077413, filed Nov. 24, 2015, and claims the benefit of priority under 35 U.S.C. § 119 of European Application 14196095.5, filed Dec. 3, 2014, the entire contents of which are incorporated herein by reference.

FIELD OF THE INVENTION

The invention relates to a sensor arrangement with at least one sensor, with a housing which is for the sensor and which is constructed of at least one plastic injection molded part.

BACKGROUND OF THE INVENTION

Such sensor arrangements are counted as belonging to the state of the art and comprise one or more sensors which are arranged in a housing manufactured of at least one injection molded part. Thereby, the sensor is either connected directly or via sensor electronics located in the housing, to at least one lead which is to be sealingly led through the housing.

Lead feed-throughs are counted as belonging to the state of the art and are differently elaborate but also differently tight, depending on the design. Whereas a sealed cable lead-through which can be released again is counted as belonging to the state of the art with larger housings for electrical apparatus, such a sealing is not suitable for sensor housings which as a rule are comparatively small.

With sensor housings, it is common to peripherally inject the leads together with a part of the housing with plastic and to thus create a sealed connection. The problem with these leads peripherally injected with plastic however is the fact that a firm bond or interconnection does not form between the lead and plastic, and a gap arises, in particular due to temperature fluctuations, via which gap moisture can penetrate into the housing, for example due to a capillary effect, by diffusion or in another manner. This is particularly problematic with small sensor housings, since even small quantities of moisture can be sufficient to damage the electronics located in the housing, or the sensor itself.

Although it is counted as belonging to the state of the art with sensor arrangements such as for example from EP 2 083 250 A1, to construct the housing in a multi-layered manner and to form at least one layer of a diffusion-tight plastic. It is also known to arrange a desiccant within the housing, in order to bind any penetrating moisture. Such desiccants such as silica gel or calcium chloride are counted as belonging to the state of the art, but however require a separate encasing, in order not to come into direct contact with the sensitive electronic components.

This problem is amplified with sensor arrangements with a comparatively small housing, with which the sensor itself is in contact with the fluid, as is the case for example with pressure sensors or differential pressure sensors or temperature sensors (EP 2 626 567 A1). Here too, the lead feed-through itself can be directly subjected to surrounding fluid, at least to a moist or humid environment.

SUMMARY OF THE INVENTION

Against this background, it is an object of the invention, to improve a sensor arrangement of the known type, to the extent that on the one hand the housing is better sealed from penetrating fluid, and on the other hand the lead feed-through into the housing is simple and inexpensive with regard to design. In a further development of the invention, the penetrating fluid is to be bound, in order to obtain an as long as possible service life of the sensor arrangement.

A sensor in the context of the present application is to be understood as the part of the sensor arrangement, via which the variable to be measured is detected, thus the actual electronic and/or mechanical element, whose change is detected and whose signal is actively or passively processed by way of sensor electronics as the case may be. Such a sensor for example can be formed by a thermoelement, by a strain gauge or other known sensor elements.

The sensor arrangement according to the invention comprises at least one sensor which is arranged in or on a housing which consists of plastic and is constructed of at least one plastic injection molded part. At least one electrical lead is sealingly led through the housing and is electrically conductively connected to the sensor or to sensor electronics which are present in the housing as the case may be. According to the invention, the sealing between the housing and the lead is formed by an O-ring.

The basic concept of the sensor arrangement according to the invention is not to sealingly introduce a cable into the housing or to directly peripherally inject the lead leading into the housing with plastic, as is the case with the state of the art, but to individually seal each lead with respect to the housing, thus to the housing feed-through, by way of an O-ring, in order in this manner to create a reliable sealing between the lead and the housing which is stable over the longer term, independently of the further encasing. Such a sealing is simple in design, inexpensive in manufacture and assembly as well as stable over the longer term. It reliably prevents moisture from being able to penetrate between the encasing and the lead, into the housing, as is the case with the state of the art. This sealing of the lead itself with respect to the housing forms the basis for a lead feed-through which is tight or sealed over the longer term.

Hereby, according to one advantageous design of the invention, a recess is provided in the housing, wherein the recess is provided for feeding through a lead and in which recess an O-ring comes to bear, said O-ring being seated on the lead passing through the recess. A classic sealing between two surfaces by way of an O-ring is effected with this. Preferably, the O-ring is thereby arranged in a peripheral groove of the lead, in order thus to ensure a defined position and to simplify the assembly, by way of the O-ring being pushed onto the lead before the assembly and being resiliently held within the groove.

It is particularly advantageous if the recess comprises a conically peripheral section which is aligned such that this becomes narrower seen from the inside to the outside, by way of the O-ring coming to bear. This conical section simplifies the assembly of the lead with the O-ring seated thereon, since the conical section guides the lead with the O-ring seated thereon and leads it into the designated position, in which the O-ring bears in a sealing manner peripherally within the recess.

The housing of the sensor arrangement according to the invention advantageously consists of at least two housing parts, which are each designed of plastic injection molding, wherein advantageously at least one part of the sensor electronics is located within the housing. The two-part design simplifies the assembly, as the case may be permits a reopening of the housing in the case of a repair, and ensures that the sealing lead feed-through can be effected essentially independently of the remaining assembly steps.

According to a further development of the invention, at least one absorption body for absorbing and for binding moisture is arranged within the housing, in order not to endanger the long-term stability of the sensor arrangement, even in the case that moisture should penetrate into the sensor housing, wherein the absorption body has a defined spatial shape and is designed as a plastic injection molded part, thus is arranged within the housing in a defined manner and can be assembled as a solid body.

An absorption body in the context of the invention is to be understood as a body which can permanently bind water and/or humidity. Thereby, according to the invention, one should use an absorption body whose plastic can absorb at least 0.5 percent by weight of water and/or at least 0.2 percent by weight of humidity, preferably more than 5 percent by weight of water and/or more than 2 percent by weight of humidity. The greater the absorption capacity for fluid and/or humidity, the more favorable this is. However, what is essential is that the water or the humidity remains bound in the absorption body. A number of plastics which are predestined for this are known. Here, polyoxymethylene, polyethersulfone, acrylonitrile butadiene styrene or preferably polyamide can advantageously be used. E.g. a plastic of the stock company BASF, Germany which is specified under the trademark Ultramid® A3W has been found to be suitable for this, and here it is the case of a polyamide. This plastic can absorb 8 to 9 percent by weight of water (at 23° C.) or 2.5 to 3.1 percent by weight of humidity (at 23° C. and 50% relative air humidity). Hostaform® C9021 of Ticona Ltd Germany is cited as a polyoxymethylene by way of example. The plastic provided under the trademark Ultrason® E 2010 G6 SW 15038 by BASF stock company, Germany is specified by way of example as a polyethersulfone. A plastic offered by the Saudi Arabian company Sabic under the trademark Cycolac® Resin S702S is mentioned by way of example as an ABS plastic. The plastics mentioned above are all suitable for injection molding and have the necessary water-binding or humidity-binding characteristics.

Moisture in the context of the invention is not only to be understood as water, but also as any fluid which is to be bound in such a housing, such as alcohol or petrol for example, depending on the fluid environment for which the sensor arrangement is envisaged. It is to be understood that the absorption body is accordingly adapted for binding this fluid. Absorption bodies for different fluids can also be provided in a housing.

It is particularly advantageous to seal the two housing parts to one another by way of an O-ring. Such O-rings are standard components which are inexpensively available and ensure a high sealedness. It is advantageous to seal off all housing parts to one another in each case via O-rings in the case that the housing is constructed from more than two housing parts.

A particularly advantageous sensor arrangement results if the housing comprises a housing part which is tubular at least in sections and a cover which terminates this at one end. This cover is then advantageously connected to the other housing parts amid the integration of an O-ring. Thereby, the tubular section is preferably circularly round, but not necessarily, in the region, in which the seal is integrated. The O-ring can also follow an oval or other housing contour which for example can be given or advantageous with regard to the installation situation of the sensor arrangement in a device.

It is particularly advantageous if the at least one electrical lead is led through a housing part, preferably the cover of the housing. Usefully, all lead feed-throughs are in only one housing part, since then only one housing part is to undergo the manufacturing and assembly steps necessary for the feed-through of the lead.

The sealing of the lead with respect to the housing part, according to the invention is effected by an O-ring. The lead or each lead, according to an advantageous further development of the invention, at its side which is remote to the housing is conductively connected to a lead, in order to ensure a reliable electrical connection, wherein this lead connection is advantageously coated by with an electrically insulating shrink sleeve and then peripherally injected with plastic. If several leads are arranged here, which is generally the case, then it is to be understood that these, after completion of the electrical connection, are coated in each case with a shrink sleeve and then together are peripherally injected with plastic. The electrical connection is advantageously effected by soldering, but can also be effected by way of welding or by way of a clamping connection. Thereby, it is advantageously such that firstly the leads with the O-rings attached thereon are arranged in the respective recesses in the cover or, as the case may be, in another housing part, whereupon the electrical connections are created, the shrink sleeves attached, and finally the thus formed lead connection is peripherally injected with plastic, in order to thus be fixedly and unreleasably connected to the cover or the respective housing part.

It is advantageous with regard to assembly technology as well as for reasons of stability and sealedness, if the cover is designed in a plug-like manner and comprises a cover part engaging over the face side of the tubular housing, said cover part terminating with this housing part and comprising a shouldered, plug-like cover part which engages into the tubular housing part. An O-ring is arranged between the shouldered cover part and the inner side of the tubular housing part, for sealing the two housing parts.

According to an advantageous further development of the invention, the end of the tubular housing part which is remote from the cover is formed out into a tip, in which the sensor is arranged. Thus, the sensor is arranged in the tip at one end of the tubular housing part, and the cover comprising the electrical lead feed-throughs is arranged to the other end, with such an arrangement.

The sensor electronics are advantageously at least partly arranged on a circuit board which longitudinally passes through the tubular housing part, at one end carries the sensor or sensors and at the other end is connected to the leads led through the housing cover and carries the respective lead contacts.

According to a further development of the invention, the absorption body is adapted to the inner contour of the housing and is arranged at a distance to the housing wall by way of spacers, in order for the space formed within the sensor housing to be utilized by the absorption body as much as possible. These spacers on the one hand prevent the absorption body bearing on the housing wall, so that a certain circulation and thus also distribution of moisture is possible around the absorption body. On the other hand, the spacers are important so that a certain free space remains between the absorption body and the housing wall, said free space being required by the absorption body, in order to be able to accordingly expand when absorbing humidity.

The spacers are advantageously part of the absorption body and preferably are formed by spring tongues which project laterally out of the absorption body and which in the installed condition are supported on the housing wall and thus hold the absorption body within the housing at a distance to the housing wall.

Advantageously, the absorption body comprises a central recess which is essentially rectangular in cross section and which is provided for receiving the circuit board. Thereby, the recess is designed such that the circuit board longitudinally passes through the absorption body, but is distanced to this.

So as to ensure an unambiguous positional assignment between the tubular part of the housing and the absorption body, positive-fit means are advantageously provided between these components, said positive fit means unambiguously determining their arrangement to one another. Moreover or alternatively, positive-fit means are provided between the housing cover and the absorption body and which unambiguously determine their arrangement to one another. Such a design permits an assembly of the components to one another only in the desired predefined position, and incorrect assemblies are reliably ruled out by way of this.

The absorption body can also advantageously delimit the space for receiving the O-ring between the tubular housing part and the cover, at one side, so that practically no further measures are necessary on the housing components for receiving the O-ring, as the design described below in more detail particularly shows.

Advantageously, a projecting spring tongue which engages into a recess or into a projection on the circuit board and which firmly holds the circuit board in particular within the absorption body is advantageously provided in the central recess of the absorption body, in order to connect the absorption body and the circuit board to one another. This arrangement in particular is advantageous with regard to a simplified assembly, since the circuit board can firstly be arranged in the absorption body and then this part which is unified via the spring tongue, as quasi one part can be joined into the sensor housing.

If the sensor is to be in quasi direct contact with the fluid, then it is advantageous if the housing in the region of the sensor comprises an opening, and the sensor is sealed with respect to the housing by way of an O-ring in the region of the opening. The O-ring in this region too forms a simple seal which is easy to assemble and is inexpensive and stable over the longer term.

Two openings are provided in the housing, in the region of the sensor at opposite sides of the sensor, if the sensor is to be designed as a differential pressure sensor, such as with the application in circulation pumps, in particular heating circulation pumps, but also on other fields, wherein advantageously each of these openings is sealed with respect to the sensor by way of an O-ring.

It is particularly advantageous if all seals of the sensor housing are formed by O-rings, since no special seals are then necessary and one can apply inexpensive seal elements which are simple to assemble. Such O-rings can just as well be applied as a radial seal and/or axial seal, without an adaptation of the seal itself being necessary. It is only the sealing seat which is to be designed accordingly. O-rings are inexpensive in manufacture and in particular have a very high sealedness with the static loading which is of relevance here.

The invention is hereinafter explained in more detail by way of one embodiment example which is represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the sensor arrangement which is represented in the figures comprises a housing 1, which is formed from a tubular housing part 2 and a cover 3. An absorption body 4 as well as a circuit board 5 are arranged in this housing 1. The circuit board 5 carries the sensor electronics and is provided at one end with electrical contacts 6 for the electrical connection and at the other end with the actual sensor 7, with which it is the case of a differential pressure sensor. The housings 2 and 3 are designed as plastic injection molded parts, just as the absorption body 4 which is provided for absorbing fluid, here water. The absorption body 4 binds the water or humidity located within the housing 1, in order to thus protect the electronic components arranged on the circuit board 5 from moisture.

Figure 4:
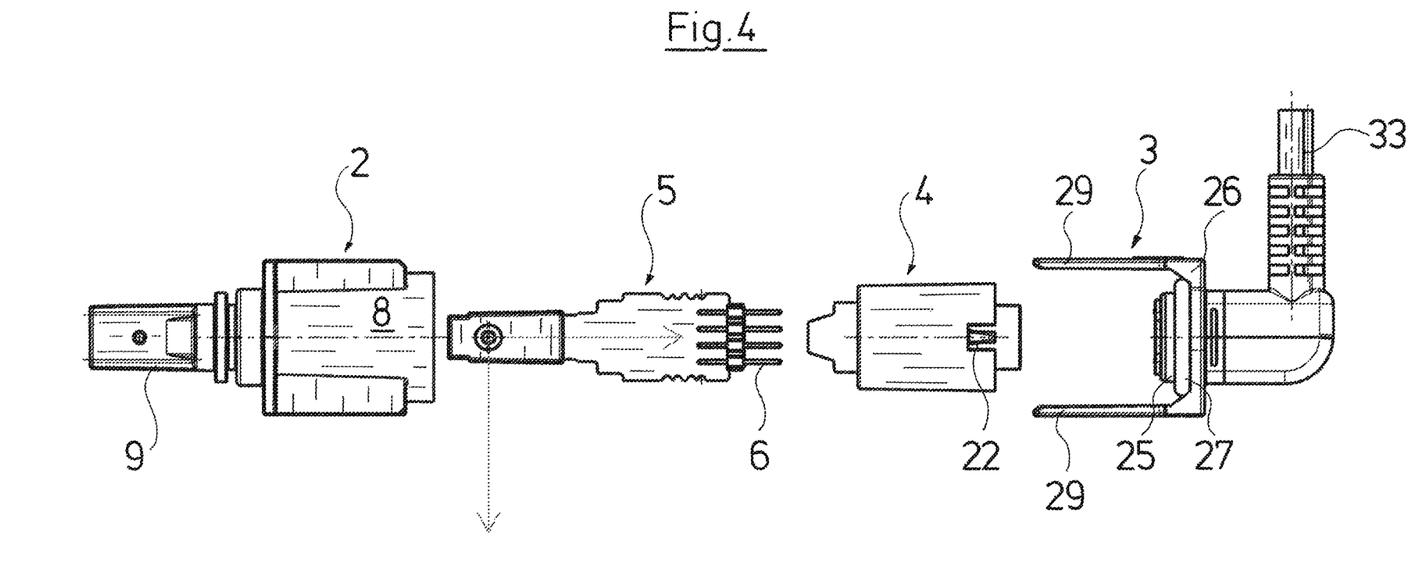
FIG. 4 is a view of the components of the sensor arrangement according to FIG. 1.
Figure 5:
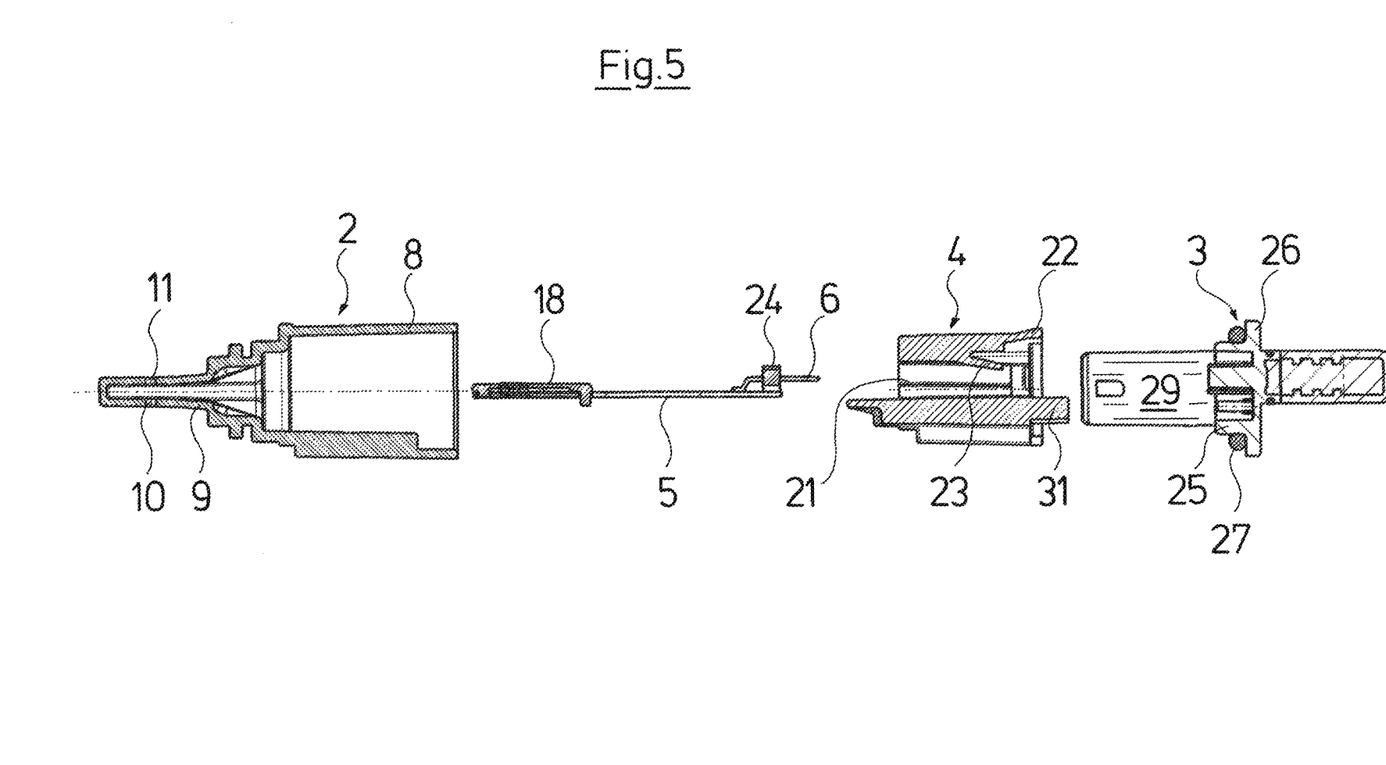
FIG. 5 is a longitudinal sectional view through the components according to FIG. 4.

The housing part 2 comprises a tubular section 8 which has an essentially hollow-cylindrical shape and at one axial end (at the right end in the FIGS. 4, 5 and 6) is designed for receiving the cover 3 and at the other axial end is formed into a tip 9 which is likewise formed as a hollow body and is provided with a recess 10 and 11 in each case on two flat sides which are away from one another by 180. The sensor 7 is seated here and this as a differential sensor can be impinged from two sides and is connected to the respective fluid, whose pressure is to be detected.

The represented sensor arrangement is envisaged for integration into a suitable recess in a pump housing, as is counted as belonging to the state of the art for example from EP 2 626 567 A1. The tip 9 is seated within a soft-elastic sealing sleeve 12 which surrounds the tip and comprises recesses 13 and 14 which are aligned or flush with the recesses 10 and 11 and which lead to corresponding channels in the pump housing. The sleeve is shaped out into a sealing ring 15 for sealing, and this sealing ring connects axially to the sealing sleeve 12 and is arranged on a shoulder 16 of the tubular housing part 2 between the tubular section 8 and the tip 9.

Figure 8:
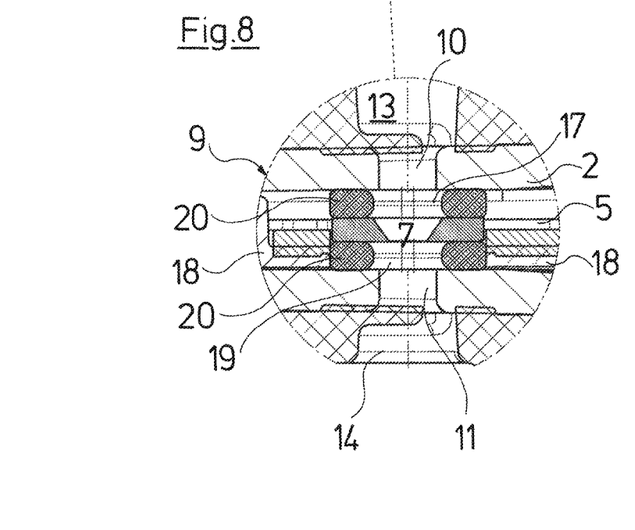
FIG. 8 is an enlarged representation of the detail VIII of FIG. 6.

A spacer body 18 which consists of a soft-elastic material, projects beyond the circuit board 5 at its tip-side end and fills out the free space between the tip-side end of the circuit board 5 and the cavity within the housing tip 9 and thus fixes the axial position of the circuit board 5 is provided so that the sensor 7 arranged in the region of a recess 17 in the circuit board is arranged in the designated position within the housing tip 9, said position being represented in FIG. 8. This spacer body 18 is supported at the inside within the housing part 2 roughly in the region, in which the seal 15 come to bears at the outside, and in a manner aligned to the sensor 7 and the recess 11 comprises a recess 19 which, as is the case with the recess 17 in the circuit board, peripherally supports an O-ring 20 which at one side is supported by the sensor 7 and at the other side by a wall of the housing part 2. These O-rings 20 which surround the sensor on both sides seal this with respect to the housing part 2, so that the fluid fed via the recesses 10 and 11 in the housing tip 9, although reaching the sensor 7, cannot get into the housing 1.

Figure 1:
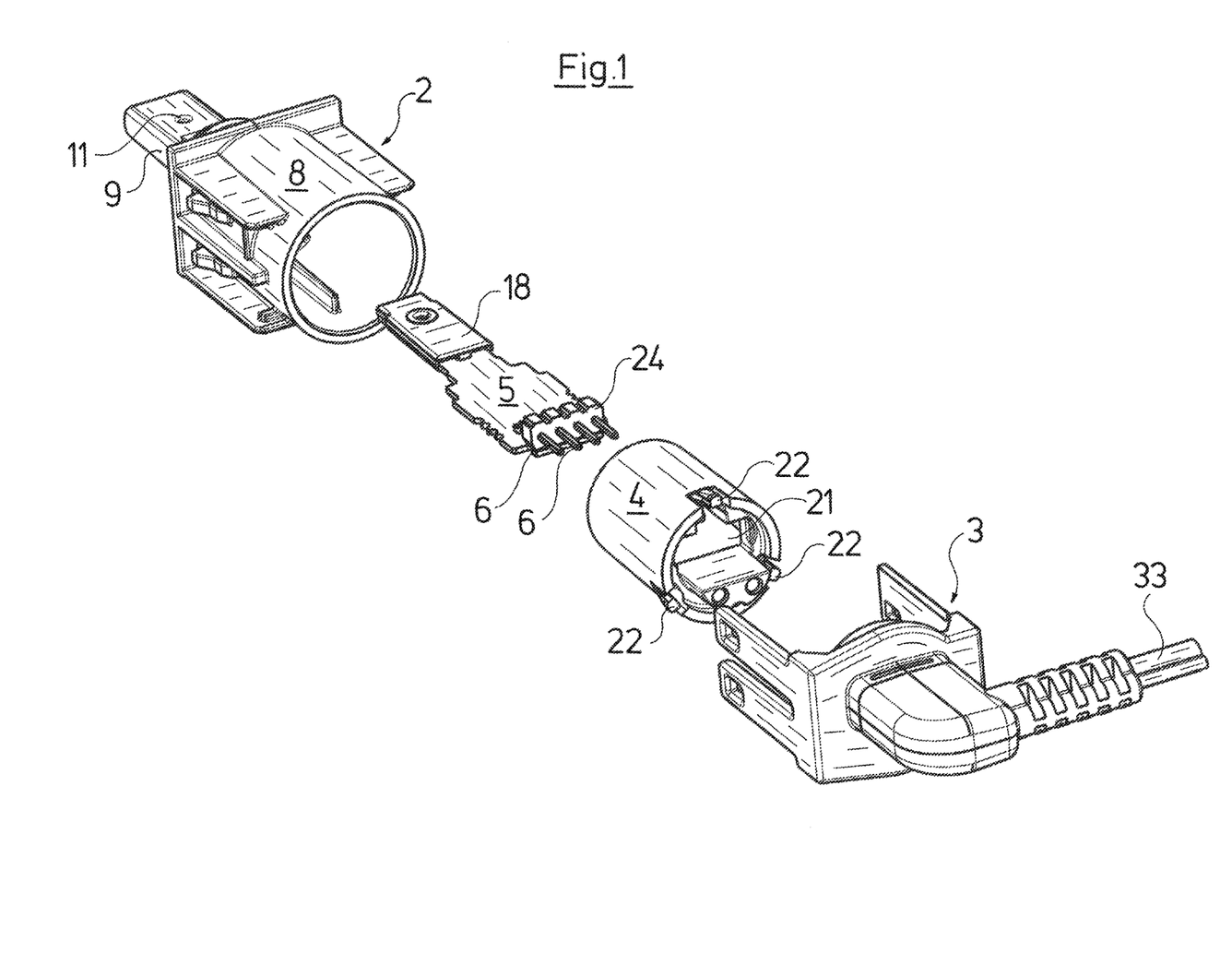
FIG. 1 is a greatly simplified exploded perspective representation of a sensor arrangement according to the invention.
Figures 2, 3:
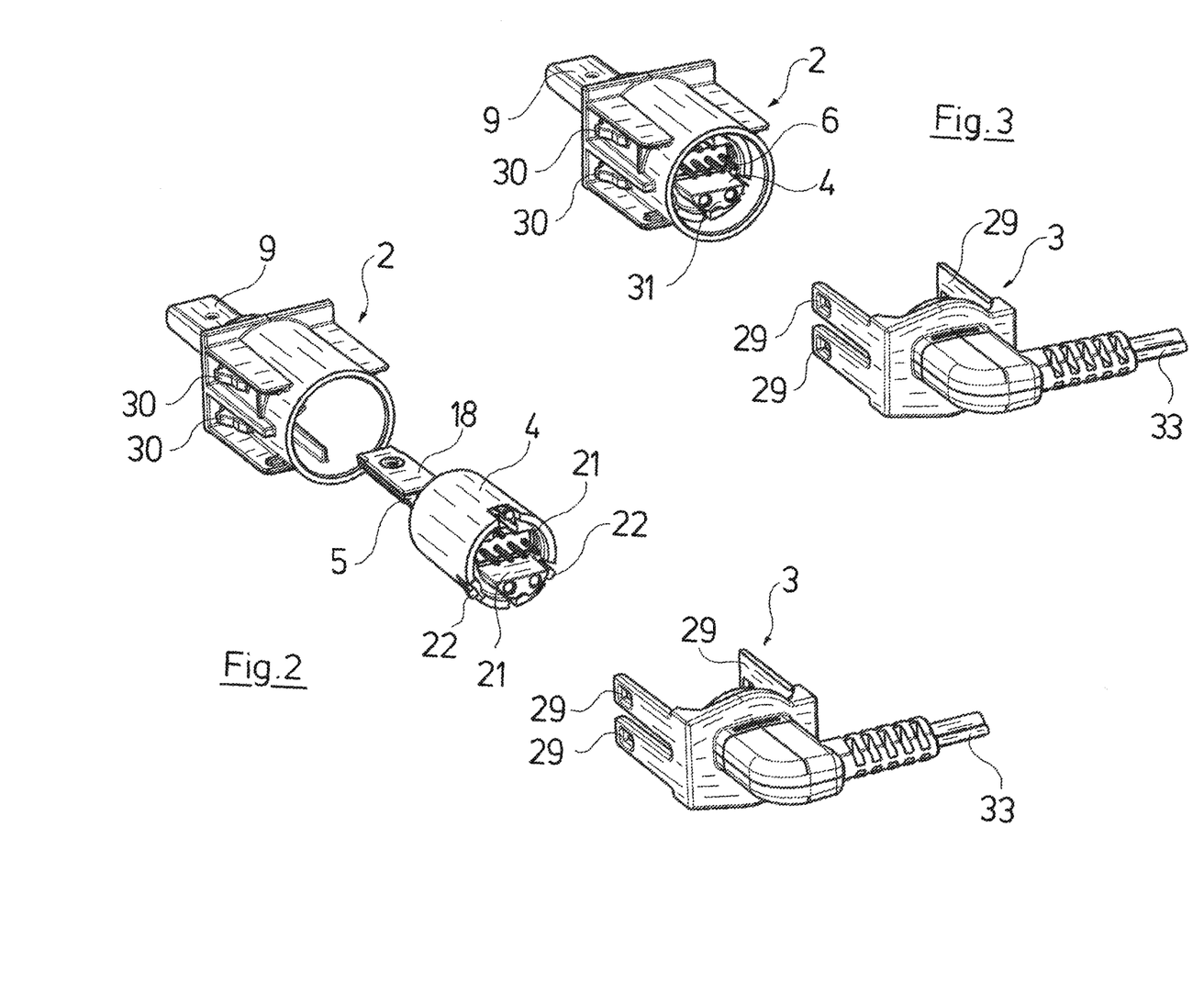
FIG. 2 is the sensor arrangement according to FIG. 1, after a first assembly step.
FIG. 3 is the sensor arrangement according to FIG. 1 according to a second assembly step.

The circuit board 5 in the region of the tubular section 8 is received in a recess 21 which passes through the essentially cylinder-shaped absorption body 4. The absorption body 4 is essentially adapted to the inner contour of the tubular housing part 2 in this region. It comprises three projections 22 which are uniformly distributed over the periphery, and are in the form of tongues which form spacers and project obliquely to the rear, thus in the direction of the connection-side end, as well as radial outwards, and ensure that the absorption body 4 bears at a radial distance within the tubular housing part 2. The circuit board 5 at the non-furnished side of the circuit board 5 which lies at the top in FIG. 6 lies with a small distance within the recess 21, and at the other side with a greater distance, in order to form a free space for the electronic components which are located on the circuit board 5. A spring tongue 23 which projects obliquely inwards and to the connection-side end is formed within the recess 21, in the absorption body 4, and this spring tongue ensures that the absorption body 4 and the circuit board 5 remain connected to one another, thus can be handled quasi as one component, after the connection of these, as is represented in FIG. 2. For this, the spring tongue 23 engages behind a projection 24 on the circuit board 5, said projection here serving for leading out the electrical contacts.

Figure 6:
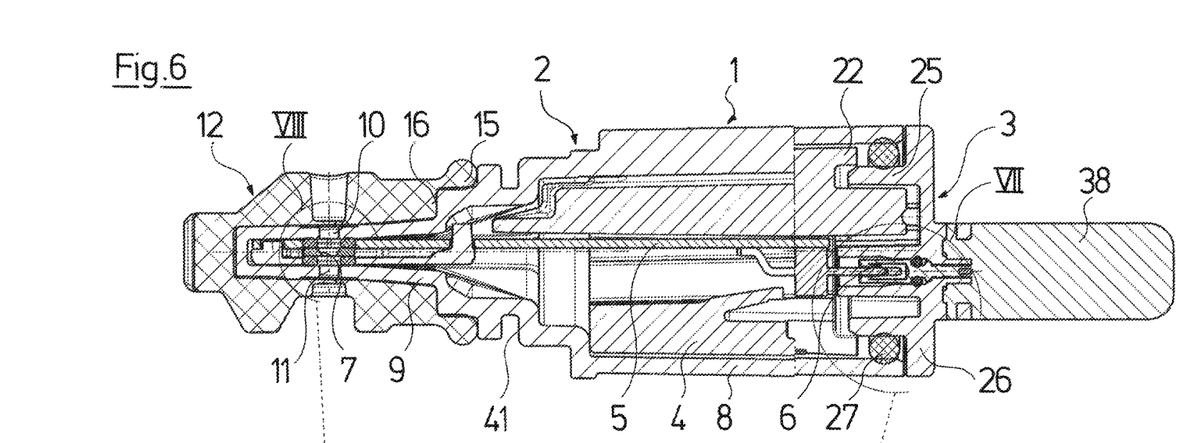
FIG. 6 is a longitudinal sectional view through the assembled sensor arrangement.
Figure 7:
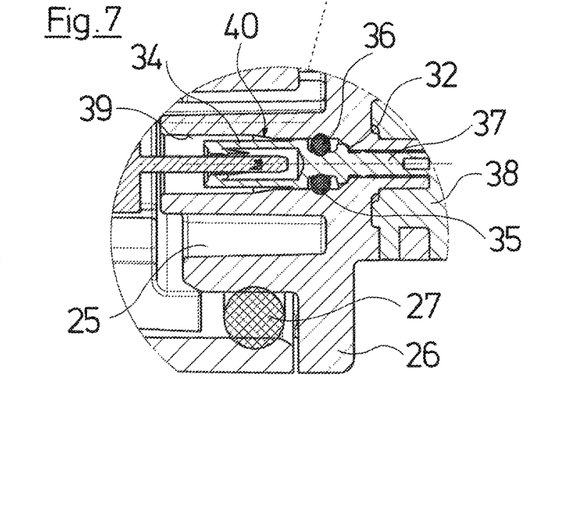
FIG. 7 is an enlarged representation of the detail VII of FIG. 6.

The cover 3 is designed in a plug-like manner and comprises an annular section 25 which projects inwards into the tubular section 8 of the housing part 2 and is surrounded by this at a distance (in the assembled condition see FIG. 6). A flange 26 projects radially beyond this annular section 25 and terminates the tubular section 8 at the face side and bears on this. The inner side of this flange 26 as well as the outer side of the annular section 25 form the cover-side part of a seat for an O-ring 27 which is delimited radially to the outside by the annular section of the housing part 2 and axially by the projections 22 of the absorption body 4. The O-ring 27 seals the housing parts 2 and 3 to one another. The components are connected by detent tongues 29 which connect laterally onto the flange 26, run in the direction of the housing part 2 and on pushing together the housing parts 2 and 3 lock behind projections 30 on the outer side of the housing part 2 and thus fixedly connect the components to one another. The housing parts 2 and 3 can thus be permanently connected to one another by way of simply sticking them together, as is particularly evident from FIG. 3.

The absorption body 4 at its end which is directed to the cover, apart from the contacts 6 comprises a projection 31 which, when the circuit board 5 is integrated into the recess 21 in the absorption body 4, is received in a suitably formed pocket-hole on the inner side of the cover 3 in order to ensure that the absorption body 4 can only be integrated into the cover 3 in its designated position. A joining-together of these components is only possible in the designated position, since the projection 31 in the absorption body 4 as well as the respective pocket-hole-like recess in the cover 3 are arranged and designed asymmetrically with respect to the longitudinal middle axis.

The sensor arrangement is cable-connected in the represented embodiment, i.e. the contacts 6 are connected to leads of a cable 23 via electrical leads 32 which are led through the cover 3, wherein the sensor arrangement is signal-connected and electrically connected via this cable.

A wireless electrical supply can also be envisaged, for example inductively. The signal connection can then be effected via radio (WLAN, Bluetooth or likewise). The electrical leads 32 are of metal and each comprise a sleeve-like part 34 which points into the housing inside and which is provided for receiving a contact 6 and for the electrical connection to this. The sleeve-like part 34 of each lead 32 is designed cylindrically on the outer side and is provided with a peripheral groove 35 which is envisaged for receiving an O-ring 36. In the area of the groove 35 and beyond the groove 35 the lead is solid, has a circular cross section and is continued in a pin-like manner. This pin-like part 37 passes through the cover 3 and is continued on the outer side where the respective lead of the cable 33 is connected to this part 37 by way of soldering. The part 37 of the electrical lead 32 as well as the soldered lead of the cable 33 is electrically insulated to the outside by a shrink sleeve, on the other side of the cover 3. All leads are then peripherally injected with plastic in a manner such that this plastic part forming a pull relief 38 for the cable 33 is injected on the cover 3 with a positive fit amid the inclusion of all leads.

Cylindrically stepped recesses 39 are provided within the cover 3 parallel to the longitudinal axis, for receiving the electrical leads 32, and these recesses comprise an outwardly conically tapering section 40 and each sealingly receive an electrical lead 32 amid the integration of the O-ring 36 lying in the groove 35. The electrical lead 32 is inserted into the recess 39 from the inner side of the cover, wherein the conically tapering section serves for leading the lead 32 with the O-ring 36 into the designated position, in which the lead 32 is held axially outwards with a positive fit by the stepped recess, and the O-ring 36 bears between the recess 39 and the lead 32 in a sealing manner.

The plastic injection molded part forming the cover 3 is equipped with the leads 32 from the side which faces the housing interior, in the recesses 39, by way of these leads 32 provided with an O-ring 36 being axially inserted into the respective recesses 39 to such an extent that they bear on the respective step within the recess 39. Then the leads of the cable 33 are soldered on and the shrink sleeves which were previously pulled over the lead ends are shrunk on by way of the effected of heat, whereupon the pull relief 38 is peripherally injected and thus the cover 3 is fixedly and unreleasably connected to the cable 33 and comprises the electrical connections to the cable. The circuit board 5 which is provided with the spacer body 18 and is equipped with the O-rings 20 is then inserted into the recess 21 of the absorption body 3, and specifically with the contacts 6 in front, until the spring tongue 23 springs back behind the projection 24 and with this connects the circuit board 5 and the absorption body 4 to one another.

These connected components, as are represented in FIG. 2, are then inserted into the housing part 2 until the end of the spacer body 8 and thus also the end of the circuit board 5 are located within the tip 9 of the housing part 2 in their designated position, in which the O-rings 20 seal off the sensor 7 with respect to the housing part 2 and are in each case impinged by pressure via the recesses 10 and 11 (FIG. 3).

The housing parts 3 and 4 are still yet to be connected to one another by way of sticking together, wherein it is ensured by way of the projection 31 that the connection is effected such that the contacts 6 come into engagement in the sleeve-like parts of the electrical leads 32 which are envisaged for this, and the cover 6 is fixedly and sealingly connected to the housing part 2 amid the integration of the O-ring 27. The connection is secured by the detent tongues 29 which then engage behind the projections 30 on the housing part 2 and thus hold the sensor arrangement in the designated assembled position, so that the housing 1 with the circuit board 5 arranged therein is sealed to the outside. Thereby, the absorption body 4 is arranged at a distance to the circuit board 5 and to the housing wall, so that this can expand and thus also receive moisture when absorbing fluid which diffuses through the housing or can get into this in another manner.

All sealings of the sensor arrangement according to the invention are formed by O-rings, which is particularly advantageous since these are inexpensive in manufacture, simple in assembly and have a greater static sealing effect also over the long term. Moreover, the O-ring arrangement permits a simple exchange of the seals. The thus formed sensor arrangement then amid the integration of a sealing sleeve 12 is stuck into the recess envisaged for this, in the pump housing and is secured in this position via a peripheral groove 41 on the outer side of the housing part 2 by way of a suitable clip.

While specific embodiments of the invention have been shown and described in detail to illustrate the application of the principles of the invention, it will be understood that the invention may be embodied otherwise without departing from such principles.

The invention claimed is:

1. A sensor arrangement, in the contact with fluid, the sensor arrangement comprising:
   at least one sensor;
   a housing for the sensor which is constructed of at least one plastic injection molded part;
   at least one electrical lead; and
   a sealing between the housing and the at least one lead, wherein the at least one lead is sealingly led through the housing and the sealing between the housing and the lead comprises an O-ring preventing the fluid from entering the housing.

2. A sensor arrangement according to claim 1, wherein a recess for leading through the lead and in which the O-ring comes to bear, is formed in the housing, said O-ring being seated on the lead passing through the recess, in a peripheral groove of the lead, wherein the peripheral groove is defined by at least a first portion of the lead and a second portion of the lead, the first portion of the lead being located on one side of the O-ring and the second portion of the lead being located on another side of the O-ring.

3. A sensor arrangement according to claim 2, wherein the recess has an outwardly conically tapering section, in which the O-ring comes to bear.

4. A sensor arrangement according to claim 1, wherein the housing is constructed from at least two housing parts of a plastic injection molding, and sensor electronics are located within the housing.

5. A sensor arrangement according to claim 1, further comprising at least one absorption body for receiving and binding moisture and which is designed as a plastic injection molded component is arranged within the housing.

6. A sensor arrangement according to claim 1, wherein two housing parts are sealed to one another by way of an O-ring.

7. A sensor arrangement according to claim 1, wherein the housing comprises a housing part which is tubular at least in sections and a cover which terminates this housing part at one end, said housing part and cover being connected to one another amid the integration of an O-ring.

8. A sensor arrangement according to claim 1, wherein the at least one electrical lead is led through a housing part, through the cover of the housing.

9. A sensor arrangement according to claim 1, wherein the at least one lead which is sealingly led through the housing part, at a side which is remote from the housing, is electrical conductively connected to a lead by way of soldering, and is coated with an electrically insulating shrink sleeve and peripherally injected with plastic.

10. A sensor arrangement according to claim 1, wherein a cover is designed as a plug, an encompassing cover part terminates the face side of the tubular housing part and a shouldered cover part engages into the tubular housing part, wherein the O-ring is arranged between the shouldered cover part and the inner side of the tubular housing part, the O-ring being arranged in a spaced defined by a portion of the cover, a first portion of the lead and a second portion of the lead, wherein the O-ring is in direct contact with the portion of the cover and the electrical lead, the O-ring being located between the first portion of the lead and the second portion of the lead.

11. A sensor arrangement according to claim 1, wherein the end of the tubular housing part, which is remote from the cover, is shaped into a tip, in which the sensor is arranged.

12. A sensor arrangement according to claim 1, further comprising a circuit board, which carries the sensor electronics and longitudinally passes through the tubular housing part, and at whose one end the sensor is arranged and at whose other end the leads led through the housing cover are arranged.

13. A sensor arrangement according to claim 5, wherein the absorption body is adapted to an inner contour of the housing and is arranged at a distance to the housing wall by way of spacers.

14. A sensor arrangement according to claim 11, wherein spacers form part of an absorption body for receiving and binding moisture and are designed as spring tongues laterally projecting out of the absorption body.

15. A sensor arrangement according to claim 12, further comprising at least one absorption body for receiving and binding moisture and which is designed as a plastic injection molded component is arranged within the housing wherein the circuit board longitudinally passes through the absorption body and is distanced to this.

16. A sensor arrangement according to claim 5, further comprising positive-fit means between the tubular housing part and the absorption body to determine the arrangement of these to one another and/or positive-fit means between the housing cover and the absorption body to unambiguously define an arrangement to one another.

17. A sensor arrangement according to claim 5, wherein the housing comprises a tubular housing part and a cover, the absorption body at one side delimits a space for receiving another O-ring between the tubular housing part and the cover, the another O-ring being in contact with the cover and the tubular housing part, wherein the another O-ring is located between the tubular housing part, the absorption body and the cover.

18. A sensor arrangement according to claim 5, wherein the absorption body comprises a spring tongue which projects into central recess for a circuit board, engages into a recess or a projection on the circuit board and holds the circuit board within the absorption body.

19. A sensor arrangement according to claim 1, further comprising a further O-ring wherein the housing, in a region of the sensor, comprises an opening, and the sensor is sealed with respect to the housing by way of the further O-ring in a region of the opening.

20. A sensor arrangement according to claim 19, wherein the sensor is a differential pressure sensor, that two openings are provided in the housing on opposite sides of the sensor, in the region of the sensor, wherein each opening is sealed with respect to the sensor by way of the further O-ring.

21. A sensor arrangement according to claim 1, wherein all sealings of the sensor housing are formed by the O-ring and at least one further O-ring.

22. A sensor arrangement according to claim 5, wherein the absorption body consists of a plastic which can absorb at least 0.5 percent by weight of water and/or at least 0.2 percent by weight of humidity.

23. A sensor arrangement according to claim 5, wherein the absorption body consists of polyoxymethylene, polyethersulfone, acrylonitrile butadiene styrene or polyimide.

\* \* \* \* \*